(12) United States Patent
Shin

(10) Patent No.: US 10,138,127 B2
(45) Date of Patent: Nov. 27, 2018

(54) METHOD OF FABRICATING SILICON CARBIDE POWDER

(71) Applicant: LG INNOTEK CO., LTD., Seoul (KR)

(72) Inventor: Dong Geun Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 729 days.

(21) Appl. No.: 14/368,199

(22) PCT Filed: Dec. 13, 2012

(86) PCT No.: PCT/KR2012/010866
§ 371 (c)(1),
(2) Date: Jun. 23, 2014

(87) PCT Pub. No.: WO2013/094934
PCT Pub. Date: Jun. 27, 2013

(65) Prior Publication Data
US 2014/0367897 A1    Dec. 18, 2014

(30) Foreign Application Priority Data

Dec. 21, 2011  (KR) .................. 10-2011-0139614
Apr. 30, 2012  (KR) .................. 10-2012-0045840

(51) Int. Cl.
*C01B 32/956*  (2017.01)
*C01B 31/36*  (2006.01)
(Continued)

(52) U.S. Cl.
CPC .............. *C01B 31/36* (2013.01); *B82Y 30/00* (2013.01); *C01B 32/956* (2017.08);
(Continued)

(58) Field of Classification Search
CPC . C01B 31/36; C04B 35/565; C04B 35/62655; C04B 2235/5427;
(Continued)

(56) References Cited

U.S. PATENT DOCUMENTS 4,238,434 A * 12/1980 Enomoto .............. C04B 35/565
                                                            264/344
4,485,182 A * 11/1984 Enomoto .............. C04B 35/111
                                                            501/102
(Continued)

FOREIGN PATENT DOCUMENTS

JP        3174622 B2    6/2001
JP   2009-269797 A     11/2009
(Continued)

OTHER PUBLICATIONS

International Search Report in International Application No. PCT/KR2012/010866, filed Dec. 13, 2012.
(Continued)

*Primary Examiner* — Yogendra N Gupta
*Assistant Examiner* — Emmanuel S Luk
(74) *Attorney, Agent, or Firm* — Saliwanchik, Lloyd & Eisenchenk

(57) ABSTRACT

A method of fabricating silicon carbide powder according to the first embodiment includes preparing a silicon carbide molded member by molding a silicon carbide material; preparing a silicon carbide agglomerate member by pulverizing the silicon carbide molded member; and preparing the silicon carbide powder by heat-treating the silicon carbide agglomerate member. A method of fabricating silicon carbide powder according to the second embodiment includes preparing a primary material having a first grain size and including silicon carbide; preparing a secondary material having a second grain size by agglomerating the primary material; and preparing the silicon carbide powder by heat-treating the secondary material.

5 Claims, 1 Drawing Sheet

(51) Int. Cl.
 *C04B 35/565* (2006.01)
 *C04B 35/626* (2006.01)
 *B82Y 30/00* (2011.01)

(52) U.S. Cl.
 CPC ...... *C04B 35/565* (2013.01); *C04B 35/62655* (2013.01); *C01P 2004/61* (2013.01); *C01P 2004/62* (2013.01); *C04B 2235/5427* (2013.01); *C04B 2235/5436* (2013.01); *C04B 2235/5445* (2013.01); *C04B 2235/5454* (2013.01); *C04B 2235/6567* (2013.01); *C04B 2235/72* (2013.01)

(58) Field of Classification Search
 CPC ...... C04B 235/5436; C04B 2235/5445; C04B 2235/5454; C04B 2235/6567; C04B 2235/72
 See application file for complete search history.

(56) References Cited

U.S. PATENT DOCUMENTS

| | | | | |
|---|---|---|---|---|
| 4,571,331 | A * | 2/1986 | Endou | B82Y 30/00 264/332 |
| 4,643,859 | A * | 2/1987 | Mitomo | C01B 21/0685 264/125 |
| 4,681,861 | A * | 7/1987 | Saito | C04B 35/575 501/132 |
| 4,690,790 | A | 9/1987 | Bates | |
| 4,772,524 | A * | 9/1988 | Coblenz | C04B 30/02 428/375 |
| 4,874,725 | A * | 10/1989 | Furukawa | C04B 35/575 501/152 |
| 4,897,229 | A * | 1/1990 | Sawaki | C04B 35/571 264/28 |
| 5,082,597 | A * | 1/1992 | Tashiro | C04B 35/565 252/504 |
| 5,370,854 | A * | 12/1994 | Henley | B01J 8/087 423/344 |
| 5,756,409 | A * | 5/1998 | van Dijen | C09K 3/1418 423/345 |
| 5,863,325 | A * | 1/1999 | Kanemoto | C30B 23/00 117/105 |
| 5,898,008 | A * | 4/1999 | Kolker | G11B 5/7315 428/846.3 |
| 5,972,284 | A * | 10/1999 | Lindsten | B22F 3/22 264/414 |
| 6,133,180 | A * | 10/2000 | Miyake | B82Y 30/00 501/88 |
| 6,627,169 | B1 * | 9/2003 | Itoh | C01B 32/956 423/345 |
| 9,534,316 | B2 * | 1/2017 | Kim | C01B 32/956 |
| 9,840,420 | B2 * | 12/2017 | Han | C01B 32/40 |
| 2002/0003228 | A1 * | 1/2002 | Niwa | C04B 35/5607 252/516 |
| 2004/0248723 | A1 * | 12/2004 | Pujari | C04B 35/565 501/90 |
| 2006/0199722 | A1 * | 9/2006 | Aihara | C04B 35/505 501/97.2 |
| 2012/0201735 | A1 | 8/2012 | Kim et al. | |

FOREIGN PATENT DOCUMENTS

| | | |
|---|---|---|
| KR | 10-2010-0071863 A | 6/2010 |
| KR | 10-2011-0021530 A | 3/2011 |

OTHER PUBLICATIONS

Office Action dated Jul. 12, 2013 in Korean Application No. 10-2011-0139614, filed Dec. 21, 2011.

L. Carroll et al. Silicon Carbide Particle Size Effects in Alumina Based Nanocomposites. Acta Mater. Nov. 1996, vol. 44, pp. 4543-4552.

Stenitzke Martin et al. Alumina/Silicon Carbide Nanocomposites by Hybrid Polymer/Powder Processing: Microstructures and Mechanical Properties. J. Am. Ceram. Soc. Jan. 1998, vol. 81, pp. 41-48.

* cited by examiner

[Fig. 1]
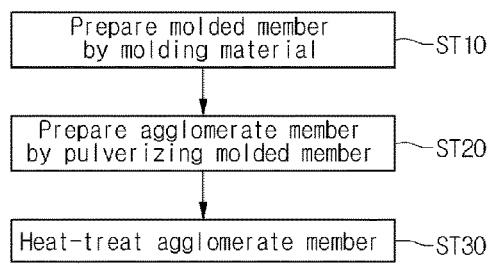
[Fig. 2]
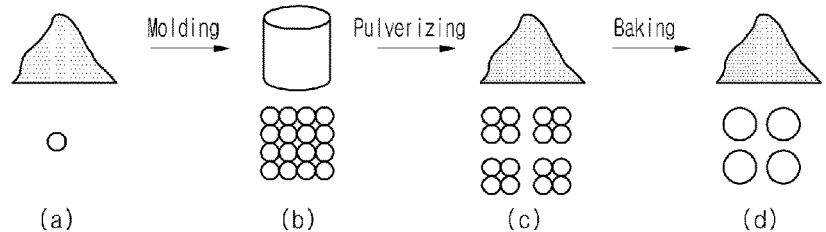
[Fig. 3]
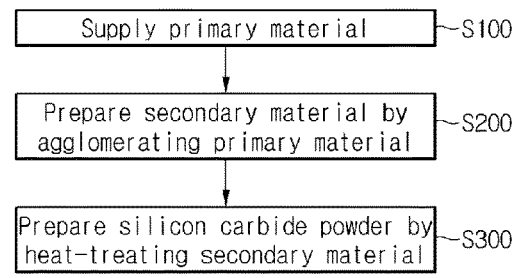
[Fig. 4]
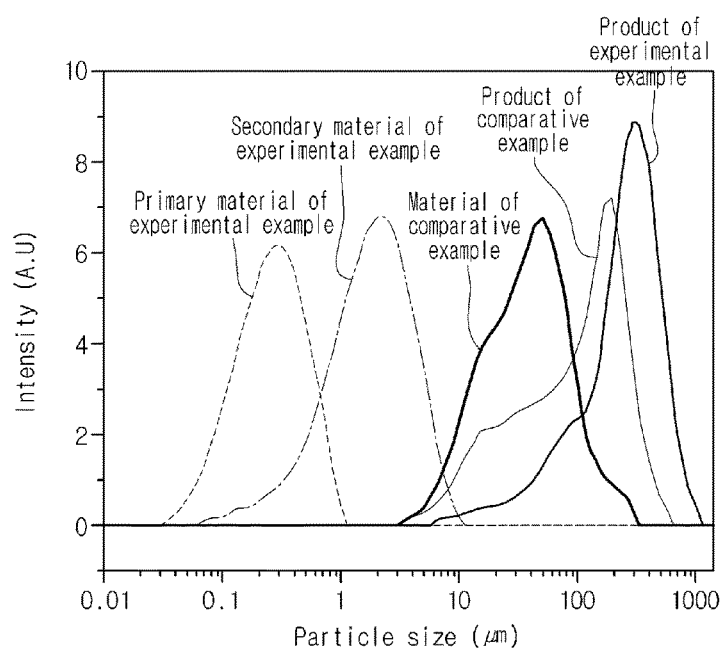

METHOD OF FABRICATING SILICON CARBIDE POWDER

CROSS-REFERENCE TO RELATED APPLICATIONS

This application is the U.S. national stage application of International Patent Application No. PCT/KR2012/010866, filed Dec. 13, 2012, which claims priority to Korean Application Nos. 10-2011-0139614, filed Dec. 21, 2011, and 10-2012-0045840, filed Apr. 30, 2012, the disclosures of each of which are incorporated herein by reference in their entirety.

TECHNICAL FIELD

The embodiment relates to a method of fabricating silicon carbide powder.

BACKGROUND ART

Recently, silicon carbide has been used in various electronic devices as a semi-conductor material for various purposes. In particular, the silicon carbide is very useful because the silicon carbide has the superior physical strength and high resistance against the chemical attack. In addition, the silicon carbide represents the superior electronic characteristics, such as the high radiation hardness, high breakdown filed, relatively wide bandgap, high saturated electron drift velocity, high operating temperature, and high absorption and emission of quantum energy in the blue, violet and ultraviolet bands of a spectrum.

In general, in a procedure of fabricating silicon carbide powder, after forming a mixture by mixing a carbon source and a silicon carbide source, the mixture is reacted so that silicon carbide powder is finally fabricated. In this case, the reaction temperature, that is, the synthesis temperature is very important in control of a grain size of the silicon carbide powder.

If the synthesis temperature is equal to 1700° C. or below, the grain size of the silicon carbide powder is formed less than 10 μm. In order to form the silicon carbide powder having a grain size of 50 μm or more, a high-temperature synthesis process is requested with a synthesis temperature of 2000° C. or above. However, the high-temperature process may cause a sub-material in a synthesis reactor to be damaged and the product yield is significantly lowered.

Therefore, when the silicon carbide powder having a grain size of several tens of micrometers or more is fabricated by synthesizing the silicon carbide powder, a method of fabricating silicon carbide powder which can grow grains at the low temperature is requested.

DISCLOSURE OF INVENTION

Technical Problem

The embodiment provides a method of fabricating silicon carbide, capable of easily controlling a grain size of silicon carbide powder.

Solution to Problem

A method of fabricating silicon carbide powder according to the first embodiment includes preparing a silicon carbide molded member by molding a silicon carbide material; preparing a silicon carbide agglomerate member by pulverizing the silicon carbide molded member; and preparing the silicon carbide powder by heat-treating the silicon carbide agglomerate member.

A method of fabricating silicon carbide powder according to the second embodiment includes preparing a primary material having a first grain size and including silicon carbide; preparing a secondary material having a second grain size by agglomerating the primary material; and preparing the silicon carbide powder by heat-treating the secondary material.

Advantageous Effects of Invention

According to the embodiment, the method of fabricating silicon carbide powder may fabricate silicon carbide powder having various grain sizes, such as a grain size in the range of several tens of micrometers to several hundreds of micrometers, by using silicon carbide particles having the grain size of several of micrometers and serving as a raw material at the lower temperature of 2000° C. or below. Thus, since the embodiment does not require any high-temperature processes, the reactor can be prevented from being damaged during the synthesis process and the process efficiency may be improved. In addition, since the silicon carbide powder having various grain sizes may be fabricated using silicon carbide particles having the grain size of several of micrometers and serving as a raw material, the method may be utilized in the field of silicon carbide raw material, such as reaction sintering and single crystal growth requiring the large-size silicon carbide powder.

Further, the method of fabricating silicon carbide powder according to the embodiment can control the grain size of the silicon carbide powder, which is finally generated, by controlling the grain sizes of the primary and secondary materials. That is, the method of fabricating silicon carbide powder according to the embodiment forms the secondary material having a larger grain size through agglomeration and then, heat-treats the secondary material, so that the method can fabricate the silicon carbide powder.

Therefore, the method of fabricating a silicon carbide powder according to the embodiment can effectively provide the silicon carbide powder having a large grain size.

BRIEF DESCRIPTION OF DRAWINGS

FIG. 1 is a flowchart showing a method of fabricating silicon carbide powder according to the first embodiment;

FIG. 2 is a view showing a process of fabricating silicon carbide powder according to the first embodiment;

FIG. 3 is a flowchart showing a method of fabricating silicon carbide powder according to the second embodiment; and FIG. 4 is a graph showing the grain size distribution of silicon carbide powder based on examples of experiment and comparison according to the second embodiment.

MODE FOR THE INVENTION

In the description of the embodiments, it will be understood that, when a substrate, a layer, a film, or an electrode is referred to as being "on" or "under" another substrate, another layer, another film, or another electrode, it can be "directly" or "indirectly" on the other substrate, the other layer, the other film, or the other electrode, or one or more intervening layers may also be present. Such a position of each component has been described with reference to the drawings.

The thickness and size of each component shown in the drawings may be exaggerated, omitted or schematically drawn for the purpose of convenience or clarity. In addition, the size of elements does not utterly reflect an actual size Hereinafter, the embodiment will be described in detail with reference to the accompanying drawings.

The method of fabricating silicon carbide powder according to the first embodiment will be described with reference to FIGS. 1 and 2. FIG. 1 is a flowchart showing a method of fabricating silicon carbide powder according to the first embodiment, and FIG. 2 is a view showing a process of fabricating silicon carbide powder according to the first embodiment.

Referring to FIGS. 1 and 2, the method of fabricating silicon carbide powder according to the embodiment includes a step ST10 of preparing a silicon carbide molded member by molding a material; a step ST20 of preparing a silicon carbide agglomerate member by pulverizing the silicon carbide molded member; and a step ST30 of preparing the silicon carbide powder by heat-treating the silicon carbide agglomerate member.

In the step ST10 of preparing a silicon carbide molded member by molding a silicon carbide material, the molded member of silicon carbide powder may be prepared by supplying the material into a mold. The material may include silicon carbide particles.

The silicon carbide particles which serve as the material may be prepared as follows.

First, the carbon source and the silicon source may be mixed so that the mixture may be formed. The process of mixing the carbon source and the silicon source with each other may be performed through the wet mixing process or the dry mixing process according to whether the solvent is used or not.

Then, the silicon carbide particles may be prepared by reacting the mixture. In detail, mixture powder is weighed in a graphite crucible and then the mixture powder is supplied and heated in a high-temperature reaction furnace, such as a graphite furnace. The process to form the silicon carbide may be classified into the carbonization process and the synthesis process.

In the carbonization process, the organic carbon compound is carbonized so that carbon is produced. Thereafter, the synthesis process is performed. In the synthesis process, the silicon source is reacted with the carbon source, so that the silicon carbide is formed through following reaction formulas 1 to 3.

$SiO_2(s)+C(s) \rightarrow SiO(g)+CO(g)$      [Reaction Formula 1]

$SiO(g)+2C(s) \rightarrow SiC(s)+CO(g)$      [Reaction Formula 2]

$SiO_2(s)+3C(s) \rightarrow SiC(s)+2CO(g)$      [Reaction Formula 3]

The material, that is, the silicon carbide particles prepared according to the above-described method may be provided into a mold. Then, by pressing the mold in the state that silicon carbide is filled in the mold, a silicon carbide molded member having a shape corresponding to the mold may be prepared. The silicon carbide molded member may be formed with various molding schemes and pressures according to the method of fabricating the molded member.

Then, in the step ST20 of preparing a silicon carbide agglomerate member by pulverizing the silicon carbide molded member, the silicon carbide molded member may be pulverized after crushing the silicon carbide molded member. Preferably, the silicon carbide molded member may be pulverized in a uniform size.

Next, in the step ST30 of preparing the silicon carbide powder by heat-treating the silicon carbide agglomerate member, the silicon carbide powder having a desired grain size may be prepared by heat-treating the silicon carbide agglomerate member which is obtained by pulverizing the silicon carbide molded member.

The heat treatment may be performed at the temperature in the range of about 1800° C. to about 2000° C. Preferably, the heat treatment may be performed at the temperature in the range of about 1800° C. to about 1900° C.

In general, during the growth of silicon carbide powder, the process of extinguishing and combining small surrounding particles is performed. At this time, the necking phenomenon may occur because the particles may adhere to each other at boundaries therebetween. Thus, a single silicon carbide particle may be formed if the boundary surfaces between silicon carbide particles are bonded to each other.

In order to facilitate the necking between the silicon carbide particles, it is important to increase energy of the interfacial surface between the silicon carbide particles. Thus, as the energy of the interfacial surface is increased, the sintering and growth of the silicon carbide particles may be accomplished at the lower temperature.

According to the method of fabricating silicon carbide powder of the embodiment, the molded member is prepared using silicon carbide powder having a grain size of several of micrometers or preferably in the range of 0.3 μm to 5 μm which serves as a raw material. Then, the molded member may be pulverized in a uniform size after crushing the molded member, so that the agglomerate member is formed. Next, the agglomerate member may be heat-treated.

In this case, since the agglomerate member is prepared by strongly pressing the interfacial surfaces of the silicon carbide against to each other, the agglomerate member has high stress energy. Thus, the particles are easily combined, that is, easily subject to the necking through a low-temperature heat treatment, so that single silicon carbide powder may be formed.

According to the embodiment, the method of fabricating silicon carbide powder may fabricate silicon carbide powder having various grain sizes, such as a grain size in the range of several tens of micrometers to several hundreds of micrometers, with silicon carbide particles having the grain size of several of micrometers serving as a raw material at the temperature of 2000° C. or below. Thus, since the embodiment does not require any high-temperature processes, the process efficiency may be improved.

In addition, since the silicon carbide powder having various grain sizes may be fabricated with silicon carbide particles having the grain size of several of micrometers serving as a raw material, the method may be utilized in a silicon carbide raw material field, such as reaction sintering and single crystal growth.

Hereinafter, the method of fabricating silicon carbide powder according to the second embodiment will be described with reference to FIGS. 3 and 4. FIG. 3 is a flowchart showing a method of fabricating silicon carbide powder according to the second embodiment, and FIG. 4 is a graph showing the grain size distribution of silicon carbide powder based on examples of experiment and comparison according to the second embodiment. The description about the method of fabricating silicon carbide powder according to the second embodiment may be essentially incorporated with the above description about the method of fabricating silicon carbide powder according to the first embodiment.

Referring to FIG. 3, in step S100, the primary material is supplied. The primary material may include the plurality of first silicon carbide particles. The purity of the silicon carbide particles may be 99.9% or above. In detail, the purity of the first silicon carbide particles may be in the range of 99.999% to 99.9999999%.

The primary material may have a first grain size. The first grain size may be about 2 μm or less. In detail, the first grain size may be in the range of about 0.01 μm to about 2 μm. In more detail, the first grain size may be in the range of about 0.01 μm to about 0.5 μm. That is, the grain size of the first silicon carbide particles may be about 2 μm or less, in detail in the range of about 0.01 μm to about 2 μm, or in more detail, in the range of about 0.01 μm to about 0.5 μm.

The primary material may be provided through the following process.

A scheme for obtaining the primary silicon carbide particles includes a carbon-thermal reduction scheme, a direct reaction scheme, a liquid polymer thermal decomposition scheme, and a high-temperature self-propagating combustion synthesis scheme.

According to the above technologies, the silicon carbide is manufactured by mixing a solid-phase silicon source, such as SiO2 or Si, with a carbon source, such as carbon or graphite, and heat-treating the mixture at the temperature in the range of 1350° C. to 2000° C.

Specifically, among the above schemes, the carbon-thermal reduction and direct reaction schemes are typically used for obtaining high-purity silicon carbide particles.

As one example, ultrahigh-purity silicon carbide particles may be obtained through the following procedure. First, a step of forming a silicon carbide raw material mixture by mixing SiO2 powder and a carbon source may be performed. The carbon source may be carbon black or a resin material. Further, the mixing ratio of carbon to silicon may be in the range of about 1.3 to about 1.8.

Then, the step of obtaining the silicon carbide particle by heat-treating the mixture material in the crucible at the temperature in the range of 1300° C. to 2000° C. for 30 minutes to 7 hours is performed. The crucible may be formed of graphite. The inner space of the crucible may be vacuum or filled with inert gas.

However, the embodiment is not limited to the above, and the method of forming silicon carbide particles according to the first embodiment or various methods may be used to obtain the ultrahigh-purity silicon carbide particles.

Thereafter, in step S200, the secondary material may be formed by using the primary material. In detail, the primary material may be agglomerated, so that the secondary material may be formed. In more detail, the first silicon carbide particles may be agglomerated, so that the secondary material may be formed.

The secondary material may include a plurality of second silicon carbide particles. The first silicon carbide particles may be agglomerated so that the second silicon carbide particles may be formed.

The secondary material may have a second grain size. The second grain size may be about 5 μm or less. In detail, the second grain size may be in the range of about 0.1 μm to about 5 μm. In more detail, the second grain size may be in the range of about 0.1 μm to about 2 μm. That is, the average grain size of the second silicon carbide particles may be about 5 μm or less, in detail in the range of about 0.1 μm to about 5 μm, or in more detail, in the range of about 0.1 μm to about 2 μm.

The secondary material may be formed by granulating the primary material. That is, the secondary material may be formed through an agglomerating process by using the first silicon carbide particles.

For example, the granulating process may include the step of mixing the first silicon carbide particles with an additive and spray-drying the mixture.

The spray drying is called a process that obtains a spherical granule by spraying a liquid-phase raw material in the drying medium at the high-temperature. The raw material may be in the form of a solution or a paste. The spray drying is very simple as compared with any other drying schemes and has a benefit in terms of continuous mass production.

In the granulating process, slurry may be fabricated by adding an additive to the first silicon carbide particles. The additive may include various organic additives such as a binder, a plasticizer, a lubricant and a dispersant. Slurry having superior dispersion property and stability may be fabricated using the additive.

The slurry may be supplied into a drying chamber. A grain size of the granule may vary according to the amount of slurry to be supplied. If the amount of slurry is increased, the grain size of the granule may become larger. Thus, the amount of slurry to be supplied may vary depending on the grain size of the granule to be manufactured.

The drying chamber can be kept with the high temperature, dry and hot wind atmosphere. If the slurry is spayed in the form of a liquid droplet under the hot wind atmosphere, the slurry comes into contact with cool gas at the initial stage so that moisture in the liquid droplet is reduced. Then, the slurry comes into contact with the hot wind atmosphere so that the powder included in the slurry may have a hard outer surface. As the powder is uniformly exposed to heat, the powder is dropped down to the bottom of the drying chamber. After the spraying and drying step is performed, the ultrahigh-purity powder may be granulated through a cyclone so that the spherical granule may be provided.

In step S300, the secondary material is heat-treated, so that the final silicon carbide powder may be formed. The secondary material may be heat-treated in the crucible at the temperature in the range of about 1800° C. to about 2200° C. In more detail, the secondary material may be heated through induction heating, so that the secondary material may be heat-treated.

The secondary material may be heat-treated for about 30 minutes to about 20 hours.

The grain size of the final silicon carbide powder may be varied with the heat treatment temperature for the secondary material.

For example, when the grain size of the primary material is in the range of about 0.01 μm to about 0.5 μm, the grain size of the secondary material is in the range of about 0.1 μm to about 2 μm, and the heat-treatment temperature of the secondary material is in the range of about 1850° C. to about 1950° C., the grain size of the final silicon carbide powder may be in the range of about 50 μm to about 70 μm.

Further, when the grain size of the primary material is in the range of about 0.01 μm to about 0.5 μm, the grain size of the secondary material is in the range of about 0.1 μm to about 2 μm, and the heat-treatment temperature of the secondary material is in the range of about 1950° C. to about 2050° C., the grain size of the final silicon carbide powder may be in the range of about 225 μm to about 275 μm.

In addition, when the grain size of the primary material is in the range of about 0.01 μm to about 0.5 μm, the grain size of the secondary material is in the range of about 0.1 μm to about 2 μm, and the heat-treatment temperature of the secondary material is in the range of about 2050° C. to about 2150° C., the grain size of the final silicon carbide powder may be in the range of about 325 μm to about 375 μm.

As described above, according to the embodiment, the silicon carbide powder is prepared by using the secondary material which is formed by agglomerating the primary material. Thus, the method of fabricating silicon carbide powder according to the embodiment may effectively fabricate the silicon carbide powder having a large grain size.

Therefore, the finally formed silicon carbide powder may be used as a material of a silicon carbide sintered body or a single crystal silicon carbide ingot.

Experiment Example

The second silicon carbide particles having the grain size of about 1.7 μm were formed by agglomerating the first silicon carbide particles having the grain size of about 0.3 μm. Then, the final silicon carbide powder was formed by heat-treating the second silicon carbide particles in a graphite crucible at the temperature of about 2100° C. for about 3 hours.

Comparative Example

The third silicon carbide particles having an average grain size of about 30 μm were provided. Then, third silicon carbide particles were heat-treated in the same way as that of the example of experiment, so that the final silicon carbide powder was formed.

Result

As shown in FIG. 2, the grain size of the silicon carbide powder according to the experimental example is about 350 μm, and the grain size of the silicon carbide powder according to the comparative example is about 150 μm.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of fabricating silicon carbide powder, the method comprising:
   preparing a primary material having a first grain size and including silicon carbide particles;
   forming a secondary material having a second grain size by mixing the primary material with an additive and by spray-drying the mixture; and
   forming the silicon carbide powder having a third grain size by heat-treating the secondary material,
   wherein, in the preparing the primary material, the silicon carbide particles are formed by mixing a solid-phase silicon source with a carbon source and heat-treating the mixture at a temperature in a range of 1300° C. to 1400° C. for 30 minutes to 7 hours,
   wherein a mixing ratio of carbon to silicon is in a range of 1.3 to 1.8,
   wherein the first grain size is in a range of 0.01 μm to 2 μm,
   wherein, in the forming the second material, the second material is formed by agglomerating the primary material,
   wherein the second grain size is in a range of 0.1 μm to 5 μm,
   wherein, in the heat-treating of the secondary material, the secondary material is heat-treated at a temperature in a range of 1800° C. to 2200° C. for 30 minutes to 20 hours, and
   wherein, in the forming the silicon carbide powder, the third grain size increases as the temperature of the heat-treating the second material increases.

2. The method of claim 1, wherein the first grain size is in a range of 0.01 μm to about 0.5 μm, and the second grain size is in a range of 0.1 μm to 2 μm.

3. The method of claim 2, wherein, in the heat-treating of the secondary material, the secondary material is heat-treated at a temperature in a range of 1850° C. to 1950° C., and the third grain size of the silicon carbide powder generated by heat-treating the secondary material is in a range of 50 μm to 70 μm.

4. The method of claim 2, wherein, in the heat-treating of the secondary material, the secondary material is heat-treated at a temperature in a range of 1950° C. to 2050° C., and the third grain size of the silicon carbide powder generated by heat-treating the secondary material is in a range of 225 μm to 275 μm.

5. The method of claim 2, wherein, in the heat-treating of the secondary material, the secondary material is heat-treated at a temperature in a range of 2050° C. to 2150° C., and the third grain size of the silicon carbide powder generated by heat-treating the secondary material is in a range of 325 μm to 375 μm.

* * * * *